(12) United States Patent
Gu et al.

(10) Patent No.: US 12,143,001 B2
(45) Date of Patent: Nov. 12, 2024

(54) POWER SUPPLY DEVICE

(71) Applicant: Hitachi, Ltd., Tokyo (JP)

(72) Inventors: Minglei Gu, Tokyo (JP); Akihiko Kanouda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 17/766,295

(22) PCT Filed: Aug. 17, 2020

(86) PCT No.: PCT/JP2020/030947
§ 371 (c)(1),
(2) Date: Apr. 4, 2022

(87) PCT Pub. No.: WO2021/079593
PCT Pub. Date: Apr. 29, 2021

(65) Prior Publication Data
US 2024/0055973 A1  Feb. 15, 2024

(30) Foreign Application Priority Data
Oct. 21, 2019  (JP) .................... 2019-191826

(51) Int. Cl.
*H02M 1/00* (2007.01)
*H02M 1/32* (2007.01)
(Continued)

(52) U.S. Cl.
CPC .......... *H02M 1/007* (2021.05); *H02M 1/0016* (2021.05); *H02M 1/4208* (2013.01); *H02M 3/33569* (2013.01)

(58) Field of Classification Search
None
See application file for complete search history.

(56) References Cited

U.S. PATENT DOCUMENTS

2004/0062063 A1* 4/2004 Siri .................. H02M 1/4208
363/84

FOREIGN PATENT DOCUMENTS

| JP | 2018-38228 A | 3/2018 |
| JP | 2018-46601 A | 3/2018 |
| WO | WO 2019/071331 A1 | 4/2019 |

OTHER PUBLICATIONS

Zhixuan Gao, Jul. 25, 2019, IEEE, Analysis of Maximum Load unbalancing limits of Cascade H-Bridge rectifier under unity Power Factor, vol. 7, pp. 1-12 (Year: 2019).*

(Continued)

*Primary Examiner* — Jared Fureman
*Assistant Examiner* — Aqeel H Bukhari
(74) *Attorney, Agent, or Firm* — Crowell & Moring LLP

(57) ABSTRACT

Provided is a power supply device in which the output voltages of unit power converters can be controlled to be substantially constant even when the loads of the respective unit power converters are different from each other. The power supply device in which a plurality of unit power converters are connected in series with an AC system and power is supplied from the unit power converters to load devices is characterized by being provided with a control device for obtaining the degree of load imbalance among the load powers of the load devices and controlling the AC system side voltages of the unit power converters to operate by reducing the power factor of the AC system when the degree of load imbalance increases.

7 Claims, 6 Drawing Sheets

(51) Int. Cl.
*H02M 1/42* (2007.01)
*H02M 3/335* (2006.01)
*H02M 7/219* (2006.01)
*H02M 7/23* (2006.01)

(56) References Cited

OTHER PUBLICATIONS

International Search Report (PCT/ISA/210) issued in PCT Application No. PCT/JP2020/030947 dated Oct. 27, 2020 with English translation (four (4) pages).
Japanese-language Written Opinion (PCT/ISA/237) issued in PCT Application No. PCT/JP2020/030947 dated Oct. 27, 2020 (three (3) pages).
M. Moosavi, "A voltage balancing strategy with extended operating region for cascaded H-bridge converters," in IEEE Transactions on Power Electronics, vol. 29, No. 9, pp. 5044-5053, Sep. 2014. (11 pages).
Extended European Search Report issued in European Application No. 20879815.7 dated Oct. 16, 2023 (9 pages).
Gao, Z. et al., "Analysis of Maximum Load Unbalancing Limits of Cascaded H-Bridge Rectifier Under Unity Power Factor", IEEE Access, Jul. 25, 2019, pp. 102530-102541, vol. 7, XP011738657 (12 pages).
Ouyang, S. et al., "Reactive Component Injection Control of the Modular Multi-Output Power Electronic Transformer", 2015 IEEE $2^{nd}$ Annual Southern Power Electronics Conference, IEEE, Dec. 5, 2016, pp. 1-7, XP033059746 (7 pages).
Jiao, N. et al.; "Analysis of Load Balancing Limits for Cascaded Rectifiers", 2018 IEEE $4^{th}$ Southern Power Electronics Conference, IEEE, Dec. 10, 2018, pp. 1-7, XP033515699 (7 pages).

* cited by examiner

POWER SUPPLY DEVICE

TECHNICAL FIELD

The present invention relates to a power supply device in which a plurality of unit power converters is connected in series to an AC system and power is supplied from each unit power converter to each load device, and particularly to a power supply device that can stably control the output voltage of the unit power converter when the load devices are different.

BACKGROUND ART

In recent years, with the increase of renewable energy and EVs and the decline in storage battery prices, the demand for energy management is increasing. Accordingly, there is a need for a power supply device that has a function capable of flexibly controlling a power flow to buildings, such as a quick EV charger.

Nonpatent Literature 1 has been known as an example of the power supply device. According to Nonpatent Literature 1, a plurality of unit power converters is connected in series to an AC system, and power is supplied from each unit power converter to each load device. According to this configuration, in order to reduce the size and weight of the power supply device, low-voltage DC power can be directly output from high-voltage AC without using a commercial transformer. In this case, a plurality of unit power converters (AC/DC converters) having a low breakdown voltage is connected in series to divide the high voltage.

CITATION LIST

[Nonpatent Literature]
Nonpatent Literature 1: M. Moosavi, G. Farivar, H. Iman-Eini and S. M. Shekarabi, "A voltage balancing strategy with extended operating region for cascaded H-bridge converters," in IEEE Transactions on Power Electronics, vol. 29, no. 9, pp. 5044-5053, September 2014.

SUMMARY OF INVENTION

Technical Problem

In the background of the introduction of a renewable energy power generation facility, the use of a power storage facility, and the increase of various electric loads, it is difficult to stably control the output voltage of a rectifier (unit power converter) when the loads of plural rectifiers connected in series are different from each other and unbalanced as in the above-described background art.

However, when the output of each unit power converter becomes unbalanced, the DC voltage of each unit power converter also becomes unbalanced in proportion to the output, and overvoltage occurs. Therefore, a control technique for stabilizing DC voltages of a plurality of unit power converters is required.

Based on the above, an object of the present invention is to solve the above-described problems and to provide a power supply device that can control output voltages of unit power converters to be substantially constant even when the loads of the respective unit power converters are different from each other.

Solution to Problem

The present invention provides a power supply device in which a plurality of unit power converters is connected in series to an AC system and power is supplied from each unit power converter to a load device, the power supply device comprising a control device that obtains a load unbalanced degree of load powers in a plurality of load devices and controls a voltage on the AC system side of the unit power converters to operate by lowering a power factor in the AC system when the load unbalanced degree becomes large.

Advantageous Effects of Invention

According to the present invention, it is possible to stably control the output voltage of each unit power converter, for example, at a transient time when the load becomes unbalanced when an output port in a quick EV charger is switched or at a transient time when each DC load in a power supply device becomes unbalanced.

DESCRIPTION OF EMBODIMENTS

Hereinafter, embodiments of the present invention will be described in detail with reference to the drawings.

First Embodiment

Figure 1:
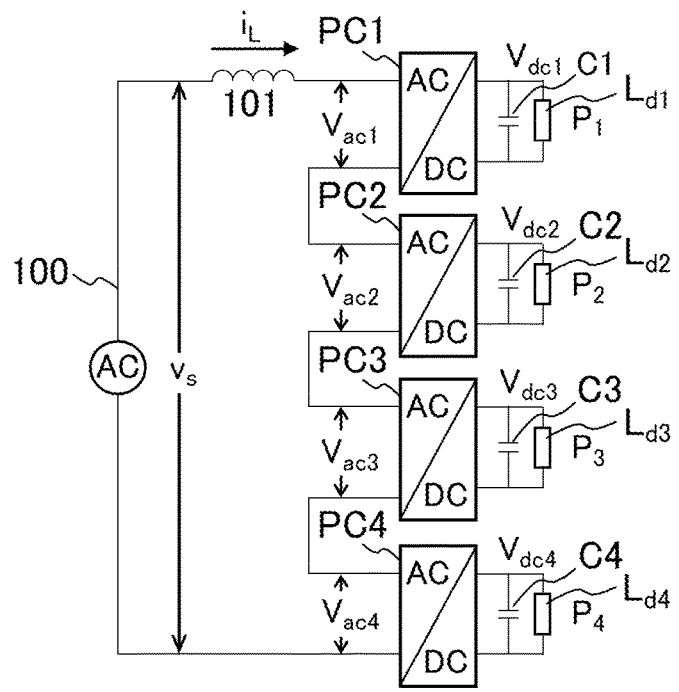
FIG. 1 is a diagram for showing a configuration example of a power supply device according to a first embodiment of the present invention.
Figure 1:
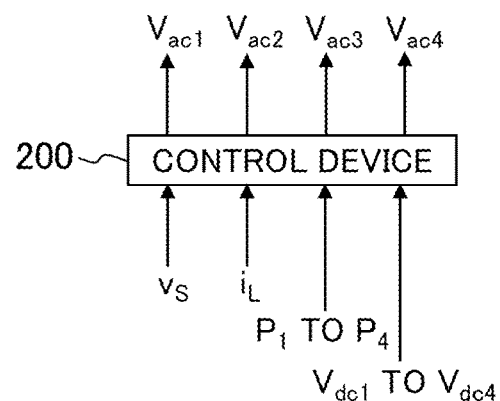

FIG. 1 is a diagram for showing a configuration example of a power supply device according to a first embodiment of the present invention. According to a main circuit configuration of a power supply device shown in the upper part of FIG. 1, AC-side terminals of a plurality of unit power converters PC (a four-unit configuration of PC1 to PC4 in the illustrated example) are connected in series and connected to an AC power supply 100 via a reactor 101. In addition, loads Ld1, Ld2, Ld3, and Ld4 are connected to the DC terminal sides of the unit power converters PC1, PC2, PC3, and PC4, respectively. In addition, capacitors C (C1 to C4) are provided in parallel with the loads Ld1, Ld2, Ld3, and Ld4. The loads in this case are, for example, quick EV chargers, and are operated in various load states such that some are in operation but others are stopped, or even when the chargers are in operation, the magnitudes of the loads are different from each other.

In the upper part of FIG. 1, Vs represents the terminal voltage of the AC power supply 100, iL represents the current thereof, Vac1 to Vac4 represent the AC terminal-side voltages of the unit power converters PC1 to PC4, Vdc1 to Vdc4 represent the DC terminal-side voltages of the unit power converters PC1 to PC4, and P1 to P4 represent the load powers of the loads Ld1 to Ld4, respectively.

A control device 200 of the power supply device shown in the lower part of FIG. 1 inputs the terminal voltage Vs and the current iL of the AC power supply 100, the DC terminal-side voltages Vdc1 to Vdc4 of the unit power converters PC1 to PC4, and the load powers P1 to P4, and performs PWM (Pulse Width Modulation) control of the unit power converters PC1 to PC4 so as to set the AC terminal-side voltages Vac1 to Vac4 of the unit power converters PC1 to PC4 to predetermined voltages.

Figure 2:
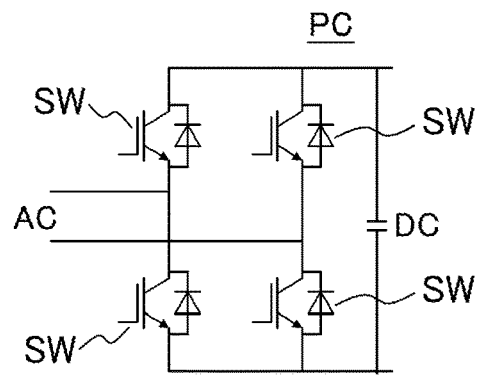
FIG. 2 is a diagram for showing a concrete circuit configuration example of a unit power converter PC.

It should be noted that the unit power converter PC is a so-called AC/DC converter that performs power conversion between AC and DC, but functions as a rectifier that converts AC to DC in a state where the power supply device shown in FIG. 1 is normally used. In addition, although various concrete circuit configurations can be employed for the unit power converter PC, for example, two sets of semiconductor switch circuits SW are connected in series to form legs, and two sets of legs are connected in parallel to form DC output terminals at both ends of the legs as exemplified in FIG. 2. In addition, it is possible to employ a configuration in which connection points of the two sets of semiconductor switch circuits SW connected in series in the legs are connected to respective AC terminals of single-phase AC. In the present invention, it is only necessary to realize an AC/DC converter, and the circuit configuration to be realized may be any configuration.

Figure 3:
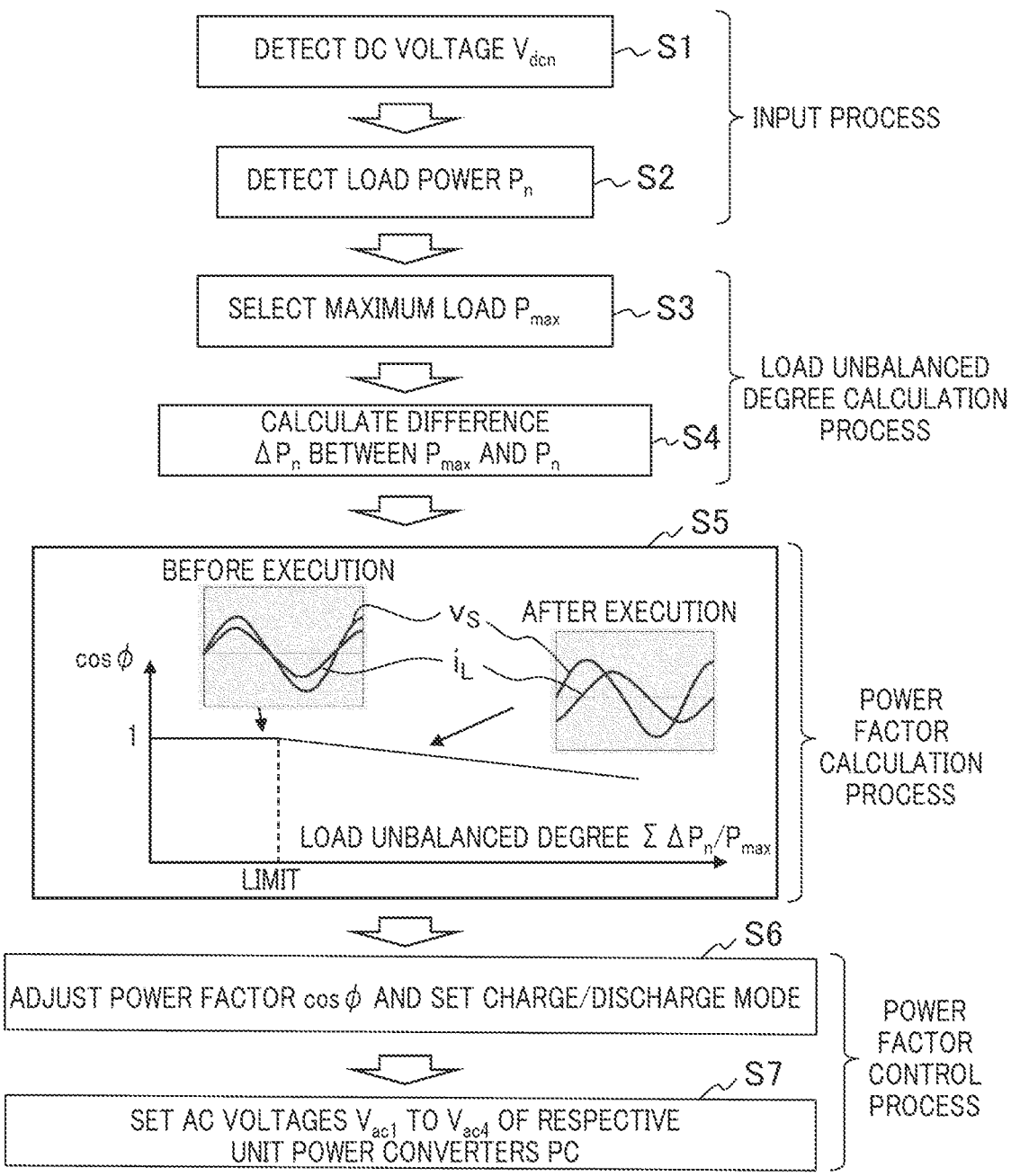
FIG. 3 is a diagram for showing the processing content in a control device of the power supply device.

FIG. 3 is a diagram for showing the processing content in the control device 200 of the power supply device, whereby the DC voltages of the plurality of unit power converters are stabilized. Since the control device 200 of the power supply device is generally realized by a CPU (Central Processing Unit) in many cases, an explanation will be giving here while intending to be the processing content in the CPU.

Processing steps S1 and S2 shown in FIG. 3 are capturing processes of an external input, and the DC terminal-side voltages Vdc1 to Vdc4 of the unit power converters PC1 to PC4 are detected and input in the processing step S1. In a processing step S2, the load powers P1 to P4 of the loads Ld1 to Ld4 are detected and input. It should be noted that when these plural inputs are not specifically distinguished from each other, they are generally abbreviated as Vdcn or Pn in some cases.

In processing steps S3 and S4 in FIG. 3, a load unbalanced degree calculation process is performed. For the load unbalanced degree to be performed here, there may be a plurality of calculation formulae for an index indicating the load unbalanced degree, and an example thereof will be described here. Here, as an example, the load having the maximum value is selected from the plurality of load powers Pn (P1 to P4) in the processing step S3. This is assumed as Pmax.

Next, a difference $\Delta P_n$ between Pmax and Pn is obtained in the processing step S4. Therefore, in the case of the example of FIG. 1 in which four sets of load powers are detected, four $\Delta$Pns are formed, one of which is zero. Further, the load unbalanced degree is calculated according to Equation (1) in the processing step S4. This is obtained by dividing each load difference $\Delta P_n$ by the maximum load Pmax and defining the total sum $\Sigma \Delta P_n$/Pmax as the load unbalanced degree. It should be noted that there are several other indexes that indicate the load unbalanced degree. These are to be determined by the average value, the sum of squares, and the like.

[Equation 1]

Load unbalanced degree=$\tau \Delta n$/Pmax    (1)

As is clear from Equation (1), as a balanced state, for example, when all the load powers Pn (P1 to P4) have the same value (for example, all are 100%), the load unbalanced degree is "0", but when the load powers become unbalanced, it shows a significant value, and it can be understood that the greater the unbalanced degree is, the greater the value is. An index indicating the load unbalanced degree other than Equation (1) described above can be employed as long as it indicates such a tendency.

A processing step S5 is a process for converting the load unbalanced degree into a power factor. In this case, the limit value limit of the load unbalanced degree is appropriately set in advance. Here, in the state of the load unbalanced degree equal to or smaller than the limit value limit (including the stable state), a power factor cos φ is set to 1, and in the state of the load unbalanced degree equal to or larger than the limit value limit, the power factor cos φ decreases as the load unbalanced degree becomes larger. That is, although the terminal voltage Vs and the current iL of the AC power supply 100 are in phase in the state of the load unbalanced degree equal to or smaller than the limit value limit, the current iL is made to have a delay phase with respect to the voltage Vs in the state of the load unbalanced degree equal to or larger than the limit value limit, and the degree of the delay phase is increased according to the magnitude of the load unbalanced degree.

Processing steps S6 and S7 relate to a power factor control process. First, in the processing step S6, a charge/discharge mode is set to the unit power converters PC1 to PC4 in order to adjust the power factor cos φ. When the load unbalanced degree is equal to or smaller than the intrinsic limit value limit of the power supply device as a normal state, the power supply device is controlled with a power factor cos φ of 1, which is the conventional control method, but when the intrinsic limit value limit of the power supply device is exceeded, the effective value of the line current iL is increased by decreasing the power factor cos φ to increase the charge/discharge current in the charge/discharge mode.

Here, the charge mode is a mode in which when the line current iL is positive (or negative), +Vdc (or −Vdc) is generated on the AC side of the unit power converters PC, the line current iL simultaneously flows into the capacitors C (C1 to C4), and the capacitor voltage increases. On the other hand, the discharge mode is a mode in which when the line current iL is positive (or negative), −Vdc (or +Vdc) is generated on the AC side, the line current iL simultaneously flows out to the capacitors, and the capacitor voltage decreases.

When the charge/discharge current in the charge/discharge mode increases, the ability to charge/discharge the capacitors C (C1 to C4) can be enhanced, and the rectifier output voltage can be stably controlled even when the load is unbalanced by accelerating the control response of the capacitor voltage that is the output voltage.

In the processing step S7, the AC terminal-side voltages Vac1 to Vac4 of the unit power converters PC1 to PC4 are determined for the unit power converters PC1 to PC4 in accordance with the charge/discharge mode set in the processing step S6, and PWM (Pulse Width Modulation) control of the unit power converters PC1 to PC4 is performed so as to become the voltages.

Figure 4:
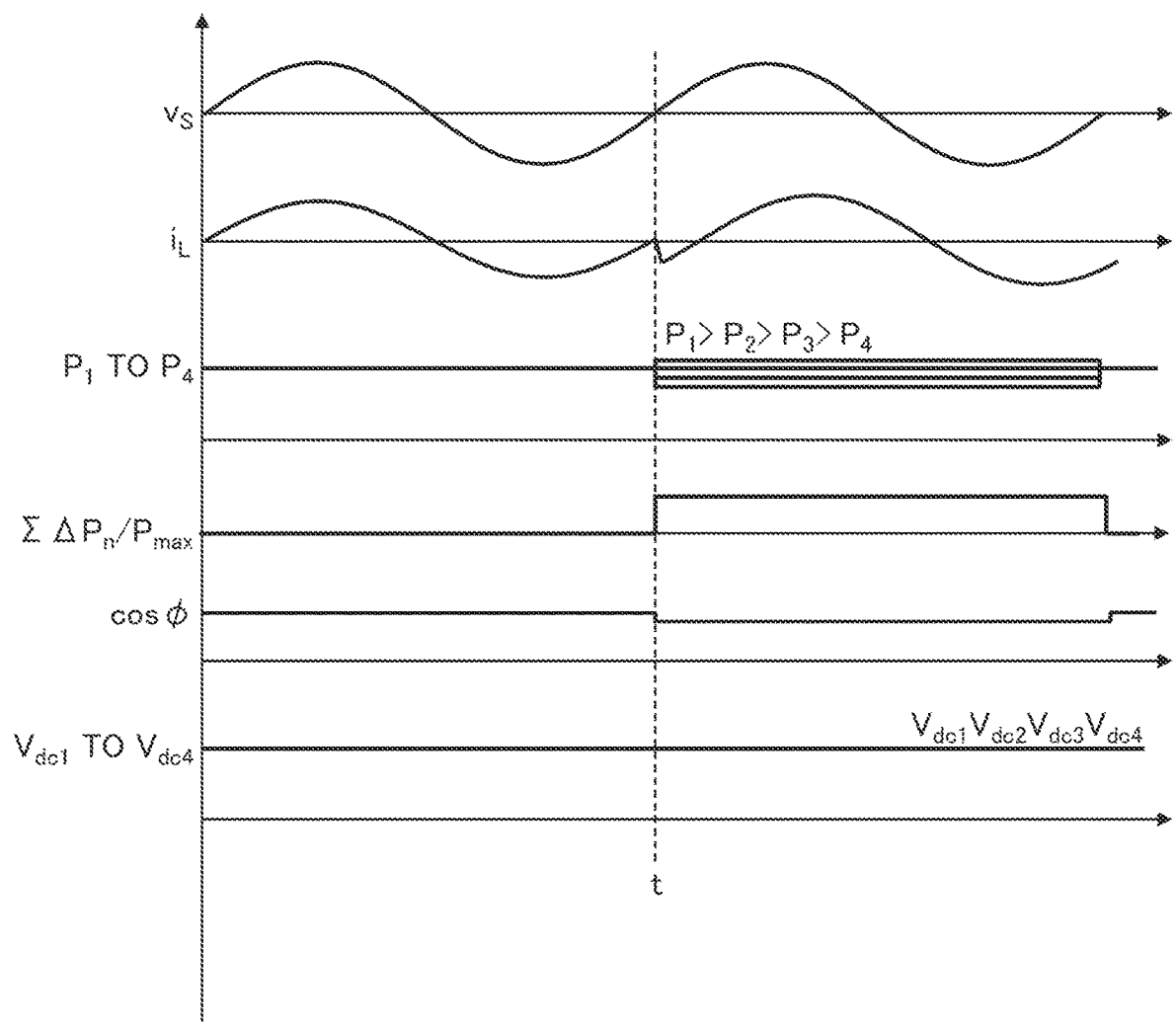
FIG. 4 is a diagram for showing the waveform of each unit when the present invention is employed.

FIG. 4 shows the waveform of each unit when the present invention is employed. This drawing shows the time series changes of the terminal voltage Vs and the current iL of the AC power supply 100, the load powers P1 to P4, the unbalanced degree $\tau\Delta n/Pmax$ of Equation (1), the power factor cos φ, and the DC terminal-side voltages Vdc1 to Vdc4 from the top.

According to the principle waveforms, before the time t in FIG. 4, the loads P1 to P4 are the same, the load unbalanced degree $\tau\Delta n/Pmax$ is zero, the power factor cos φ is 1, and the input voltage vs and the line current $i_L$ are in the same phase. After the time t, since the loads P1 to P4 become unbalanced and the load unbalanced degree $\tau\Delta n/Pmax$ is large, the phase is generated in the line current $i_L$ with respect to the input voltage vs by lowering the power factor cos φ, and the effective value of the line current $i_L$ is increased, whereby the charge/discharge capability of the capacitor is enhanced and the rectifier output voltage can be stably controlled even when the load is unbalanced. FIG. 4 describes a state up to the point where the state before the time t is restored by eliminating the load unbalanced degree $\tau\Delta n/Pmax$ thereafter.

According to the control of the present invention, each rectifier output voltage Vdc is controlled to the same value in a state where the load unbalanced degree is lowered.

Figure 5:
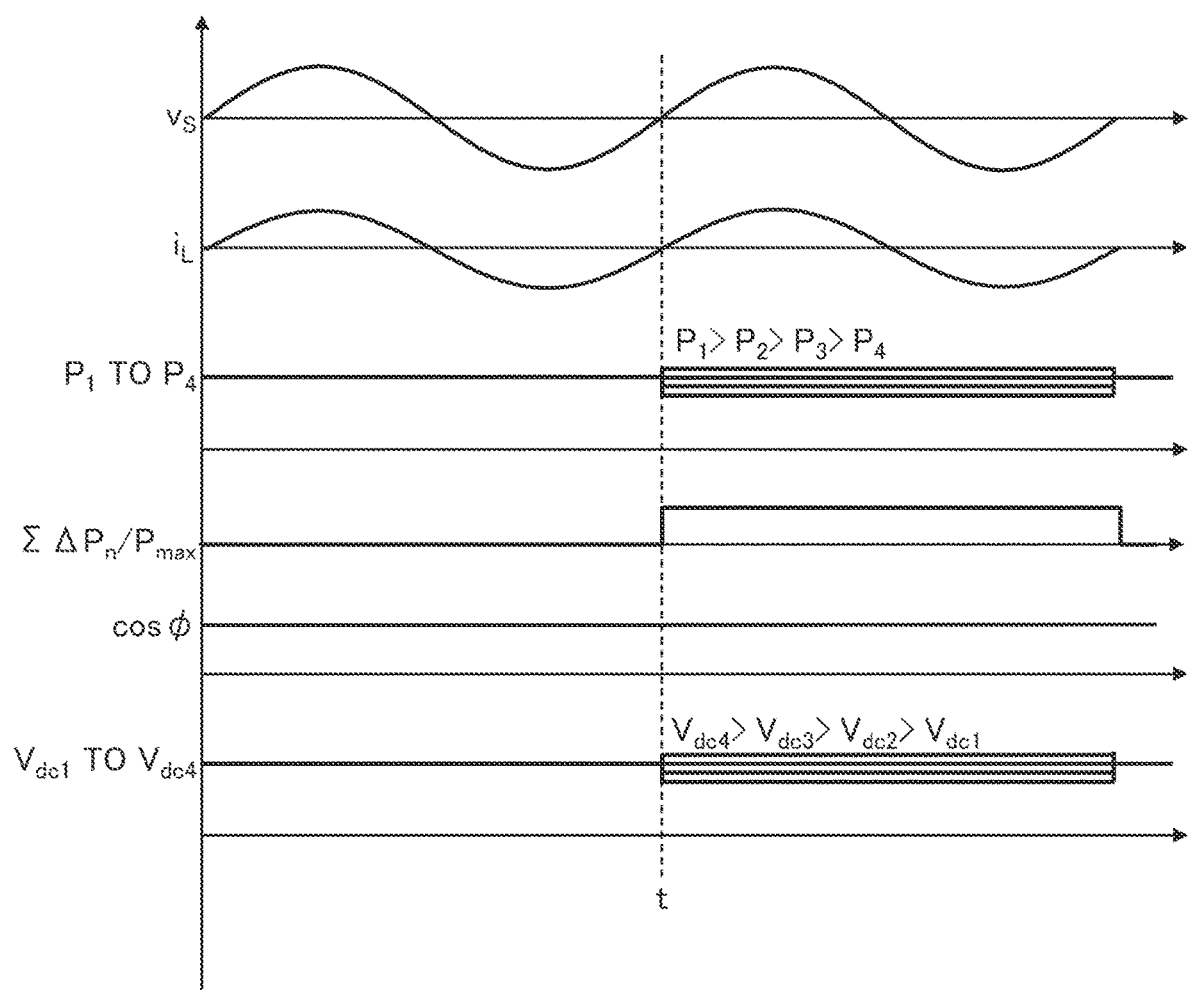
FIG. 5 is a diagram for showing the waveform of each unit when the present invention is not employed.

It should be noted that FIG. 5 shows a case where the present invention is not applied, as a reference. The state until the load becomes unbalanced at the time t is the same as that in FIG. 4. After the time t, the loads P1 to P4 become unbalanced, but the power factor is not adjusted. In this case, the DC terminal-side voltages Vdc1 to Vdc4 cannot be stably controlled. As the load becomes larger, the voltage becomes lower, and as the load becomes lighter, the voltage becomes higher. If the load P satisfies P1>P2>P3>P4, the DC terminal-side voltage Vdc satisfies Vdc4>Vdc3>Vdc2>Vdc1. It should be noted that if the load unbalanced degree $\tau\Delta n/Pmax$ is eliminated, the state before the time t is restored.

Second Embodiment

In a second embodiment, another configuration example in which the unit power converter in the power supply device of the present invention can be employed will be described by using FIG. 6.

Figure 6:
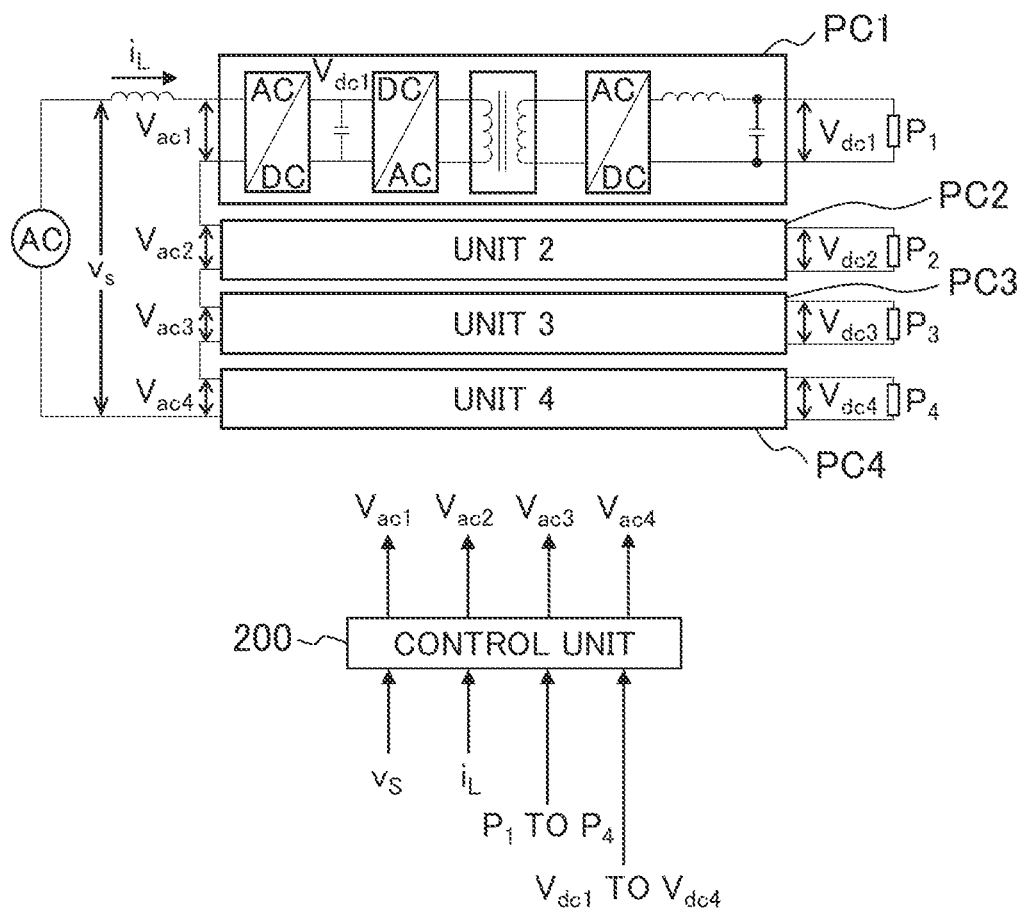
FIG. 6 is a diagram for showing a configuration example of a power supply device according to a second embodiment of the present invention.

Each unit power converter PC (PC1 to PC4) shown in FIG. 6 is configured by arranging an AC-DC converter (rectifier) REC1, a parallel capacitor, a DC-AC converter INV, a transformer Tr, an AC-DC converter REC2 (rectifier), and a parallel capacitor C sequentially from the AC input side. In addition, of these units, the DC to AC converter INV, the transformer Tr, and the AC-DC converter REC2 configure an insulated DC-DC converter. It should be noted that the configuration of the control device 200 may be the same as that of the first embodiment.

According to FIG. 6, the insulated DC-DC converter is inserted between the rectifier REC1 and the load Ld in the load section, and when EV is charged by this output, an EV charger can be configured. Here, a set of the rectifier REC1 and the insulated DC-DC converter is referred to as a unit.

According to the above configuration and usage, it is natural that charging power is different when charging each EV charger. For example, the output voltage Vdc of the rectifier REC1 can be stably controlled by using the control method according to the present invention even if the load of one unit becomes zero and the load unbalanced degree becomes high.

Third Embodiment

In a third embodiment, a further modified configuration example using the unit power converter of the second embodiment will be described by using FIG. 7.

The configuration of the unit power converter PC (unit) of the third embodiment is the same as that of the second embodiment, but the power supply-side connection and the load-side connection of the unit power converter PC (unit) are different from those of the second embodiment.

Figure 7:
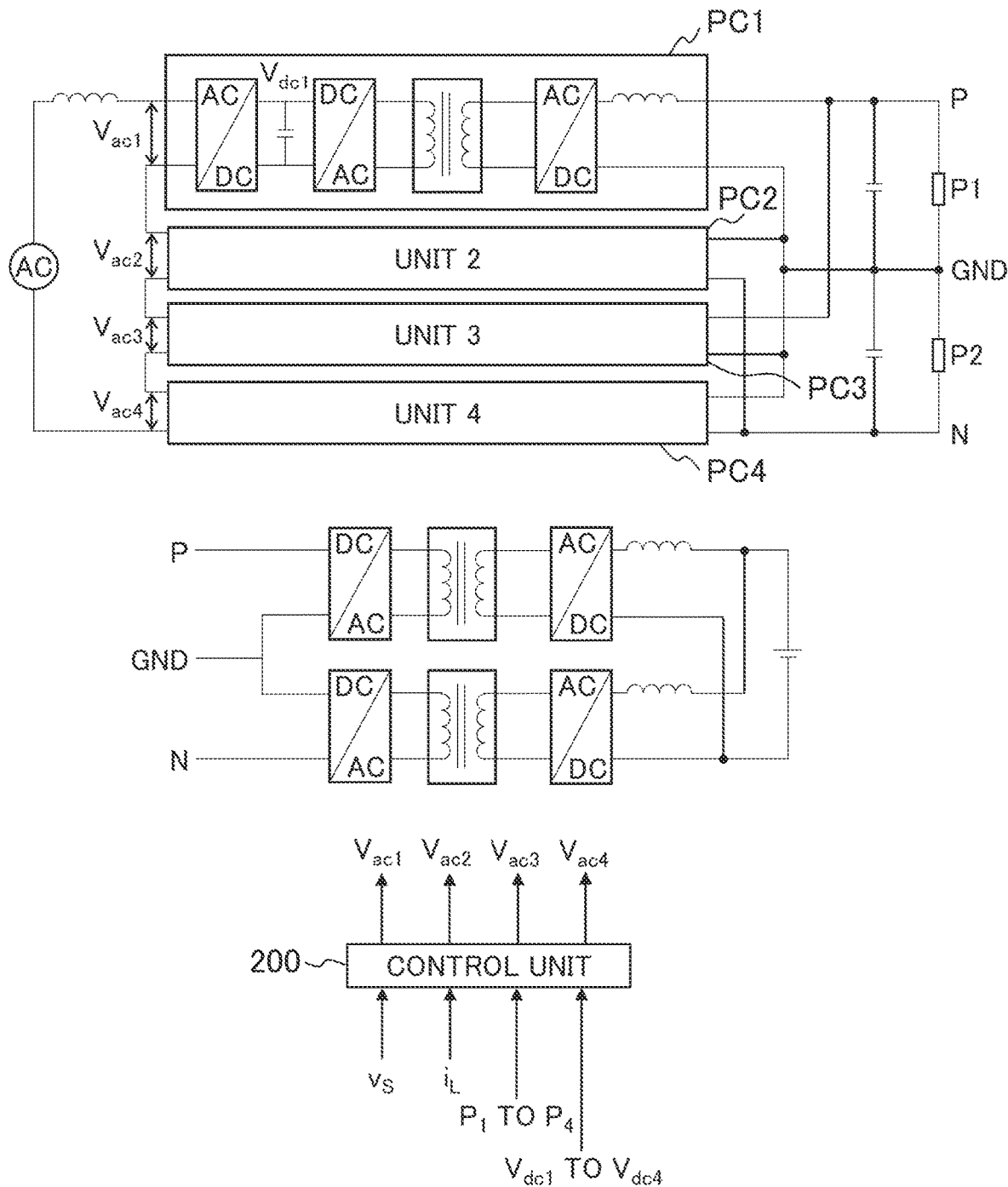
FIG. 7 is a diagram for showing a configuration example of a power supply device according to a third embodiment of the present invention.

As in a connection relationship shown in the middle of FIG. 7, an installation point GND is provided on the AC power supply side, and a positive potential is applied to the unit PC1 and a negative potential is applied to the unit PC3 to perform DC conversion. In addition, on the load side, the power supply device is configured by feeding the load P1 in parallel by a plurality of odd-numbered unit outputs and feeding the load P2 in parallel by a plurality of even-numbered unit outputs. It should be noted that the configuration of the control device 200 may be the same as those of the first embodiment and the second embodiment.

According to this configuration, when the loads of the unit PC1 and the unit PC2 are different from each other, the output voltage of the rectifier can be stably controlled by using the control method according to the present invention even if the load unbalanced degree becomes high.

When the load unbalanced degree becomes much higher, the power storage system is operated to act as a balancer in the distribution system so that the difference between the load P1 and the load P2 can be eliminated.

LIST OF REFERENCE SIGNS

PC1, PC2, PC3, PC4 unit power converter (unit)
Ld1, Ld2, Ld3, Ld4 load
100 AC power supply
101 reactor
200 control device

The invention claimed is:

1. A power supply device in which a plurality of unit power converters is connected in series to an AC system and power is supplied from each unit power converter to a load device, the power supply device comprising:
a control device that obtains a load unbalanced degree of load powers in a plurality of load devices and controls a voltage on the AC system side of the unit power converters to operate by lowering a power factor in the AC system when the load unbalanced degree becomes large.

2. The power supply device according to claim 1, wherein the control device sets the power factor to 1.0 when the load unbalanced degree is smaller than a limit value, and reduces the power factor when the load unbalanced degree is larger than the limit value.

3. The power supply device according to claim 2, wherein the control device controls the DC voltages of the plurality of unit power converters to the same value when the power factor in the AC system is lowered for operation.

4. The power supply device according to claim 3, wherein the unit power converters are configured in such a manner that two sets of semiconductor switch circuits are connected in series to configure legs, two sets of legs are connected in parallel to form DC output terminals at both ends of the legs, and connection points of the two sets of semiconductor switch circuits connected in series in the legs are connected to respective AC terminals of single-phase AC.

5. The power supply device according to claim 3, wherein each unit power converter is configured by arranging an AC-DC converter, a parallel capacitor, a DC-AC converter, a transformer, and an AC-DC converter sequentially from the AC input side.

6. The power supply device according to claim 3,
wherein the unit power converters include a first unit power converter and a second unit power converter and are configured in such a manner that power is fed to a first load in parallel, an installation point is provided on the AC system side, a positive potential is applied to the first unit power converter, and a negative potential is applied to the second unit power converter,
wherein power is fed to a plurality of loads by the plurality of unit power converters, and
wherein a plurality of first unit power converters and a plurality of second unit power converters configuring the plurality of unit power converters are connected in series to the AC system.

7. The power supply device according to claim 6,
wherein the load unbalanced degree is obtained by a calculation using the maximum value of a plurality of load powers as a denominator and the sum of differences between the maximum value and the load powers as a numerator.

\* \* \* \* \*